United States Patent
Nishimoto

(10) Patent No.: US 6,792,285 B2
(45) Date of Patent: Sep. 14, 2004

(54) SWITCHING DEVICE AND PORTABLE TELEPHONE

(75) Inventor: Hajime Nishimoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 491 days.

(21) Appl. No.: 09/954,022

(22) Filed: Sep. 18, 2001

(65) Prior Publication Data

US 2002/0155856 A1 Oct. 24, 2002

(30) Foreign Application Priority Data

Apr. 20, 2001 (JP) ........................................ 2001-122607

(51) Int. Cl.⁷ ............................................... H04M 1/00
(52) U.S. Cl. ................. 455/550.1; 455/90.3; 455/575.1
(58) Field of Search .......................... 455/550, 90, 575, 455/566, 403; 379/433.06, 433.07; 200/566, 5 R

(56) References Cited

U.S. PATENT DOCUMENTS 6,546,231 B1 * 4/2003 Someya et al. .......... 455/550.1

FOREIGN PATENT DOCUMENTS

| JP | 410155020 A | * | 6/1998 | .......... H04M/1/274 |
| JP | 11-163997 | | 6/1999 | |
| JP | 2000-173404 | | 6/2000 | |

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

The invention provides a switching device. A switching device is constructed by including a wheel and two switches. The switching device has not only a rotary shaft of the wheel but also another rotary shaft. The rotary shaft of the wheel is provided with a rotary encoder. As shown by an arrow, by rotating the wheel about the rotary shaft with a finger or the like, a predetermined item is selected. By inclining the wheel about the another rotary shaft as shown by an arrow, the switches can be turned on/off. With the configuration, the switching operation can be performed with reliability.

7 Claims, 7 Drawing Sheets

SWITCHING DEVICE AND PORTABLE TELEPHONE

BACKGROUND OF THE INVENTION

1. Field of the Invention

The present invention relates to a switching device and a portable telephone and, more particularly, to a switching device by which a predetermined item can be selected with reliability and a portable telephone having the same.

2. Description of the Background Art

In a portable telephone, a terminal, or the like, a switching device is used so that the user can select or input a predetermined item. For example, Japanese Patent Laying-Open Nos. 11-163997 and 2000-173404 disclose such a switching device. FIG. 18 shows the basic structure of the switching device disclosed in the publications. The switching device has a wheel 101 rotating about a rotary shaft 103 and a switch 102. Rotary shaft 103 of wheel 101 is provided with a rotary encoder 104. Switch 102 is provided below wheel 101.

In the switching device, by rotating wheel 101 with a finger or the like as shown by an arrow 110, a predetermined item can be selected. By pressing wheel 101 itself downward as shown by an arrow 111, switch 102 can be turned on or off.

Such a switching device has, however, the following problems. As shown in FIG. 18, in order to rotate wheel 101, a certain extent of frictional force is necessary between the finger and wheel 101. When the force of pressing wheel 101 is increased to certainly obtain such a frictional force, there is a case such that wheel 101 is pressed in to operate switch 102.

On the other hand, in the case of pressing wheel 101 to turn on/off switch 102, if the peripheral portion of wheel 101 almost right above rotary shaft 103 is not pressed, there is a case such that wheel 101 rotates and a selected item changes.

SUMMARY OF THE INVENTION

The invention has been achieved to solve the problems. An object of the invention is to provide a switching device by which the user can perform a switching operation with reliability. Another object is to provide a portable telephone having such a switching device.

According to a first aspect of the invention, there is provided a switching device having a wheel rotating about a rotary shaft, which includes: a movable mechanism and first and second switches. The movable mechanism allows the wheel to move to one side and the other side approximately along a direction of extension of the rotary shaft. The first and second switches are disposed on the one side and the other side while sandwiching the wheel, each of which performs a switching operation when being come into contact with the wheel by the movable mechanism.

With the configuration, by the movement to the one side or the other side of the wheel almost about the rotary shaft by the movable mechanism, the first or second switch is turned on/off. Unlike the conventional switching device, the switch disposed below the wheel is not turned on/off at the time of rotating the wheel, so that erroneous operation can be suppressed. Since the switching device is not disposed below the wheel, the height of the switching device can be further reduced.

Preferably, the movable mechanism allows the wheel to be tilted about another rotary shaft provided for the wheel. The wheel can be easily tilted.

Preferably, the another rotary shaft is disposed in a position passing the center of the wheel, and the first and second switches are disposed while sandwiching the another rotary shaft, on the side opposite to the portion where the wheel is allowed to perform the tilting operation.

Preferably, the another rotary shaft is disposed in a position apart from the center of the wheel from the portion where the wheel is allowed to perform the tilting operation, and the first and second switches are disposed between the another rotary shaft and the portion where the wheel is allowed to perform the tilting operation. Consequently, the distance from the portion where the wheel is allowed to perform the tilting operation to the another rotary shaft becomes longer, so that the wheel can be tilted more easily.

Alternately, it is preferable that the movable mechanism permits the wheel to slide along the rotary shaft.

Particularly in this case, the movable mechanism includes resilient members attached to the one side and the other side of the rotary shaft of the wheel. The resilient members have energizing force toward the wheel. Consequently, the first and second switches can be prevented from being erroneously turned on/off.

According to another aspect of the invention, there is provided a portable telephone having a switching device including a wheel, a movable mechanism, and first and second switches. The wheel rotates about a rotary shaft. The movable mechanism allows the wheel to move toward one side and the other side approximately along a direction of extension of the rotary shaft. The first and second switches are disposed on the one side and the other side while sandwiching the wheel and perform a switching operation when being comes into contact with the wheel by the movable mechanism.

With the configuration, the first or second witch can be turned on/off by moving the wheel to the one side or the other side almost along the rotary shaft by the movable mechanism. Unlike the conventional portable telephone, the switches disposed below the wheel are not turned on/off at the time of rotating the wheel, so that erroneous operation can be prevented. Since the switching device is not disposed below the wheel, a smaller portable telephone can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
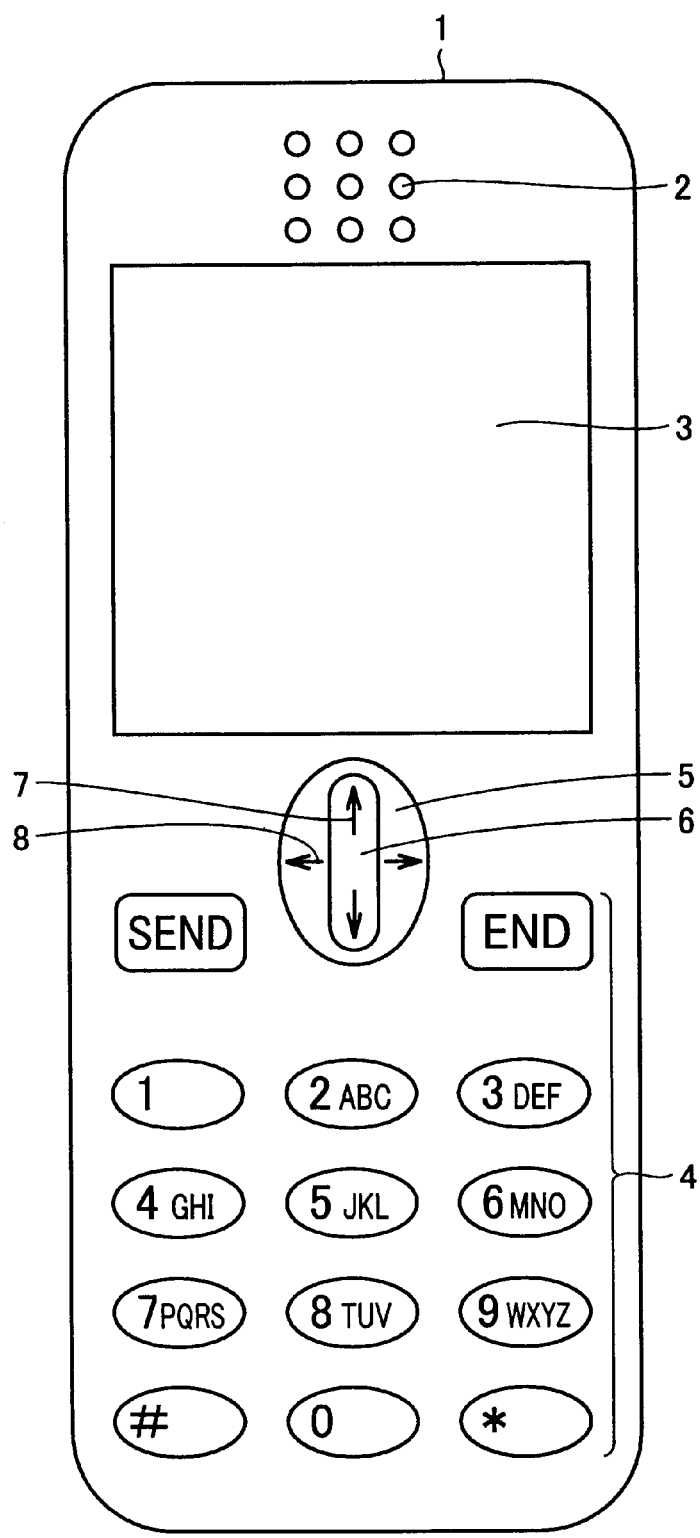
FIG. 1 is a plan view of a portable telephone having a switching device according to a first embodiment of the invention.

A portable telephone having a switching device according to the first embodiment of the invention will be described. As shown in FIG. 1, on the front face of a body case 1, a speaker 2 is provided in the upper part, a liquid crystal display 3 is provided in a central part, and a keypad 4 is provided in the lower part. A microphone (not shown) is provided in the lower part of the front face of body case 1. A switching device 5 is provided between liquid crystal display 3 and keypad 4.

As will be described hereinlater, in switching device 5, by a rotating operation of a wheel 6 as shown by arrows 7, a tilting operation or sliding operation (in total four directions) of wheel 6 almost about the rotary shafts of wheel 6 as shown by arrows 8, switching device 5 is turned on or off.

Figure 2:
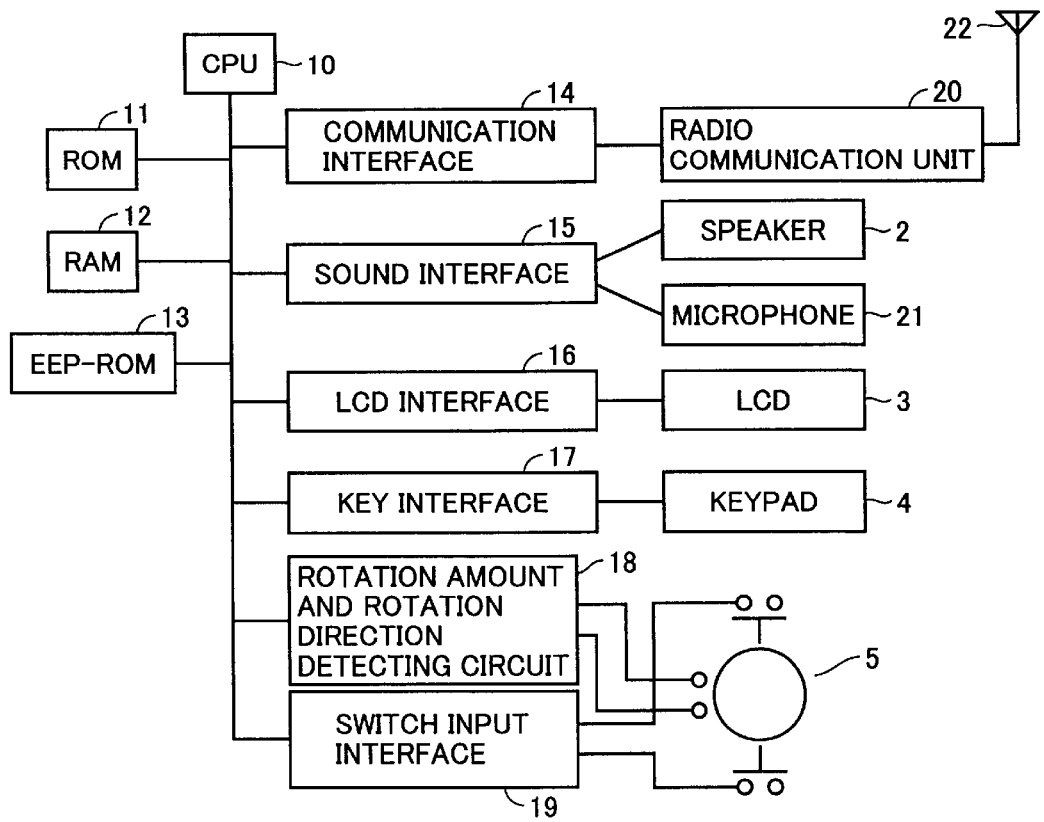
FIG. 2 is a block diagram showing a circuit configuration of the portable telephone illustrated in FIG. 1 in the first embodiment.

The circuit configuration of the portable telephone will now be described. As shown in FIG. 2, information input from keypad 4 and switching device 5 is input to a CPU (Central Processing Unit) 10. CPU 10 displays various information on liquid crystal display 3 by controlling an LCD interface 16 on the basis of the input information. CPU 10 executes a call originating process, a call finishing process, and the like by controlling a radio communication unit 20 on the basis of the input information.

CPU 10 allows predetermined information to be stored in a RAM (Random Access Memory) 12 and allows predetermined information such as a telephone number list and call origination history to an EEPROM (Electrically Erasable and Programmable Read Only Memory) 13 on the basis of a program stored in a ROM (Read Only Memory) 11.

Radio communication unit 20 performs predetermined call originating process and call receiving process by transmitting a control signal via an antenna 22 under the control of CPU 10 via a communication interface 14. Under the control of CPU 10, radio communication unit 20 performs a predetermined signal process on a sound signal input from a microphone 21 via a sound interface 15, transmits the processed signal, performs a predetermined signal process on a reception signal, and outputs the processed signal to speaker 2.

Signals accompanying the operations of switching device 5 are input to CPU 10 via a detecting circuit 18 for detecting a rotation amount and a rotation direction of wheel 6 and a switch input interface 19.

Figure 3:
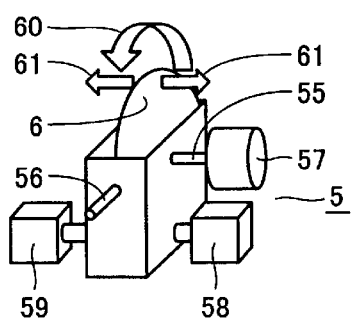
FIG. 3 is a perspective view showing the basic structure of the switching device in the first embodiment.

FIG. 3 shows an example of the basic structure of switching device 5. As shown in FIG. 3, switching device 5 is constructed by including wheel 6 and two switches 58 and 59. Switching device 5 has, in addition to a rotary shaft 55 of wheel 6, a rotary shaft 56. In this case, rotary shaft 56 is disposed in a position passing the center of wheel 6. Rotary shaft 55 is provided with a rotary encoder 57 for converting the rotation of wheel 6 into an electric signal.

In switch device 5, as shown by an arrow 60, by rotating wheel 6 about rotary shaft 55 by a finger or the like, a predetermined item is selected. As shown by arrows 61, by tilting wheel 6 about rotary shaft 56 and approximately along a direction of extension of rotary shaft 55, switches 58 and 59 can be turned on/off.

Figure 4:
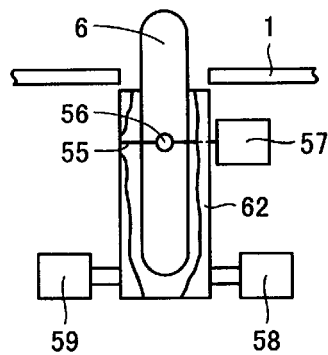
FIG. 4 is a first front view for explaining the operation of the switching device illustrated in FIG. 3 in the first embodiment.

The operation will be more concretely described. First, as shown in FIG. 4, rotary shaft 56 is disposed in almost the same plane as rotary shaft 55. In a normal state, a housing 62 for housing wheel 6 is positioned almost in the center between switches 58 and 59 by energizing force or the like of switches 58 and 59.

Figure 5:
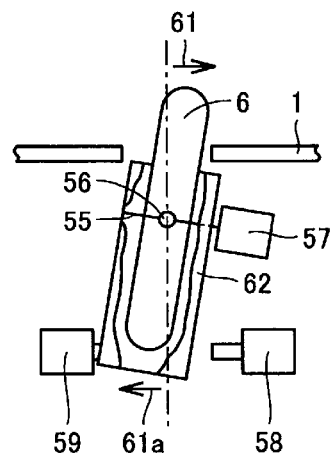
FIG. 5 is a second front view for explaining the operation of the switching device illustrated in FIG. 3 in the first embodiment.

As shown in FIG. 5, by inclining wheel 6 about rotary shaft 56 by a finger or the like, housing 62 inclines in the direction indicated by an arrow 61a and the operation of switch 59 is performed. When the finger is away from wheel 6, by the energizing force of switch 59, wheel 6 is returned to the normal position shown in FIG. 4.

Figure 6:
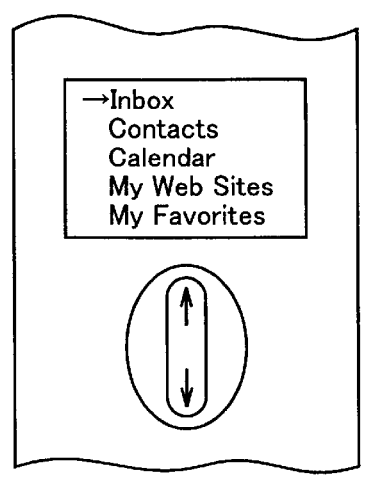
FIG. 6 is a first partial front view for explaining the operation of the portable telephone shown in FIG. 1 in the first embodiment.

An example of the operation of the portable telephone having such a switching device 5 will now be described. First, as shown in FIG. 6, it is assumed that five menus are displayed on liquid crystal display 3 and the pointer indicates "Inbox" in the beginning. In order to select "My Web Sites" from the displayed five menus, the user turns wheel 6 of switching device 5 by a finger to move the pointer to the position of "My Web Sites" as shown in FIG. 7.

Figure 7:
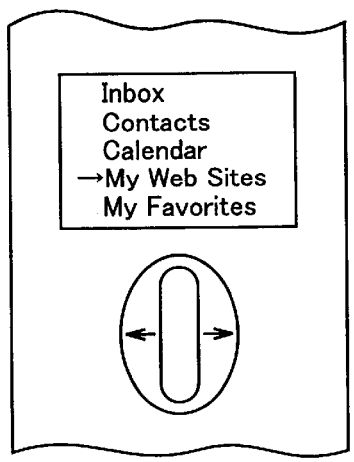
FIG. 7 is a second partial front view for explaining the operation of the portable telephone shown in FIG. 1 in the first embodiment.
Figure 8:
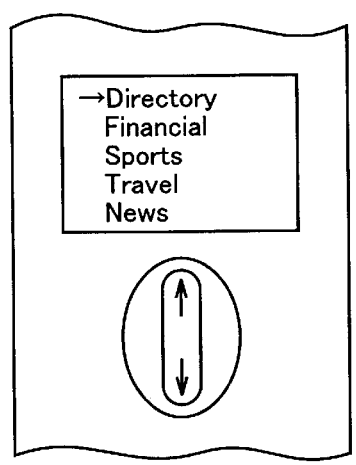
FIG. 8 is a third partial front view for explaining the operation of the portable telephone shown in FIG. 1 in the first embodiment.

As shown in FIG. 7, to select the menu in "My Web Sites", for example, the user inclines wheel 6 to the right side. As a menu screen at a higher level of "My Web Sites", as show in FIG. 8, five menus of "My Web Sites" are displayed.

Figure 9:
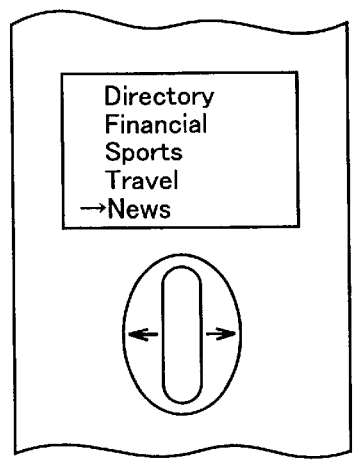
FIG. 9 is a fourth partial front view for explaining the operation of the portable telephone shown in FIG. 1 in the first embodiment.
Figure 10:
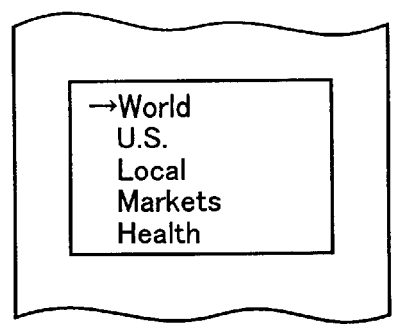
FIG. 10 is a fifth partial front view for explaining the operation of the portable telephone shown in FIG. 1 in the first embodiment.

To select "News" in the five menus of "My Web Sites", the user turns wheel 6 of switching device 5 with his/her finger to move the pointer to the position of "News" as shown in FIG. 9. Further, by inclining wheel 6 to the right side, as shown in FIG. 10, five menus in "News" are displayed. To select "World" from the displayed five menus, the user turns wheel 6 of switching device 5 by a finger to move the pointer to the position of "World".

After selecting the necessary menu in such a manner, by performing a proper input operation with keypad 4, items or the like of world news (not shown) are displayed.

By tilting wheel 6 to the left side, the menu screen at a level lower than the displayed screen can be displayed.

Switching device 5 of the portable telephone selects the menu by the rotating operation of wheel 6 about rotary shaft 55 and the tilting operation of wheel 6 about rotary shaft 56 which almost orthogonal to rotary shaft 55. Unlike the conventional switching device, when the wheel is turned, the switch disposed below the wheel is not turned on/off, so that the erroneous operation can be suppressed.

In the operation of tilting wheel 6, for example, by tilting wheel 6 to the right side, the menu at the level higher than that on the screen can be displayed. On the other hand, by tilting wheel 6 to the left, the menu at the level lower than that on the screen can be displayed.

With the configuration, particularly in the case where the user desires to obtain various information in Internet connection service, the user can promptly select the menu of desired information to access the information.

Since the switch is not disposed below the wheel, the height of the switching device can be suppressed. Consequently, the smaller or thinner portable telephone can be realized.

Second Embodiment

Figure 11:
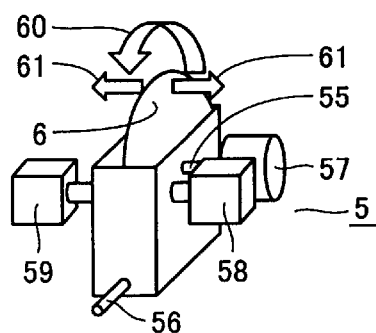
FIG. 11 is a perspective view showing a basic structure of a switching device of a portable telephone according to a second embodiment of the invention.

A portable telephone having a switching device according to the second embodiment of the invention will now be described. FIG. 11 shows the basic structure of the switching device. As shown in FIG. 11, switch device 5 is constructed by including wheel 6 and two switches 58 and 59 and, particularly, rotary shaft 56 for tilting wheel 6 is provided below wheel 6. Two switches 58 and 59 are disposed above rotary shaft 56. Since the other configuration is similar to that of the switching device described in the first embodiment, the same components are designated by the same reference numerals and their description will not be repeated.

In switching device 5 as well, as shown by arrow 60, by rotating wheel 6 about rotary shaft 55 with a finger or the like, a predetermined item is selected. By tilting wheel 6 about rotary shaft 56 and approximately along a direction of extension of rotary shaft 55 as shown by arrows 61, switches 58 and 59 can be turned on/off.

Figure 12:
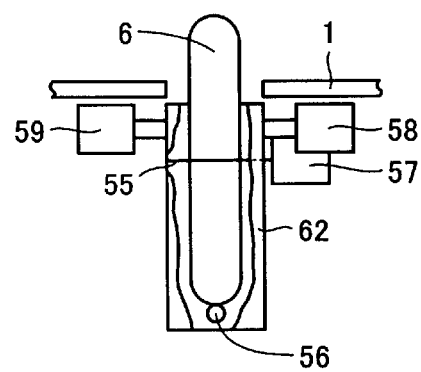
FIG. 12 is a first front view for explaining the operation of the switching device shown in FIG. 11 in the second embodiment.

The operation will be more concretely described. First, as shown in FIG. 12, in a normal state, housing 62 for housing wheel 6 is positioned almost in the center between switches 58 and 59 by the energizing force of switches 58 and 59.

Figure 13:
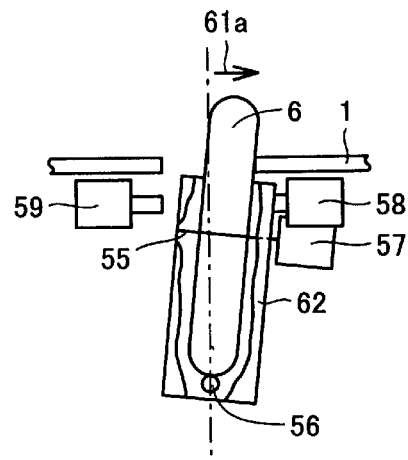
FIG. 13 is a second front view for explaining the operation of the switching device shown in FIG. 11 in the second embodiment.

As shown in FIG. 13, by tilting wheel 6 about rotary shaft 56 in the direction of arrow 61a with a finger or the like, housing 62 is also tilted toward the direction indicated by arrow 61a to thereby perform the operation of switch 58. When the finger is away from wheel 6, by the energizing force of switch 58, wheel 6 is returned to the normal position shown in FIG. 13. On the other hand, by tilting wheel 6 in the direction opposite to the direction indicated by arrow 61a, the operation of switch 59 is performed.

The portable telephone having such a switching device 5 can also perform an operation similar to that described in the first embodiment. Unlike the conventional switching device, the switch disposed below the wheel is not turned on or off at the time of rotating the wheel. Thus, erroneous operation can be suppressed.

Particularly, the distance from the portion where the finger touches to tilt wheel 6 to rotary shaft 56 is longer than that in the case of the foregoing first embodiment. Consequently, wheel 6 can be tilted more easily.

For example, in the case where the user desires to obtain various information in Internet connection service, by the operation of tilting wheel 6, the user can promptly select the menu of desired information to access the information. Particularly, by disposing rotary shaft 56 below wheel 6, the distance from the portion where the finger touches in wheel 6 to rotary shaft 56 becomes longer. Consequently, the operation of tilting wheel 6 can be performed more easily.

Third Embodiment

Figure 14:
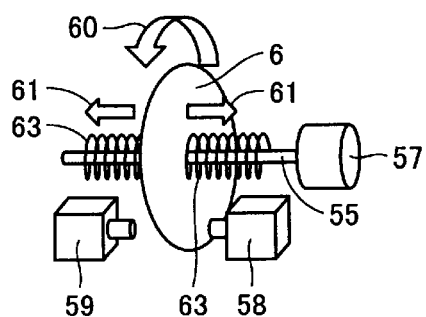
FIG. 14 is a perspective view showing the basic structure of a switching device of a portable telephone according to a third embodiment of the invention.

A portable telephone having a switching device according to the third embodiment of the invention will be described. FIG. 14 shows a basic structure of the switching device. As shown in FIG. 14, switching device 5 is constructed by including wheel 6 and two switches 58 and 59. Particularly, wheel 6 is disposed so as to be slidable along rotary shaft 55 for rotating wheel 6. A pair of resilient members 63 sandwiching wheel 6 from both sides, for applying energizing force is attached to rotary shaft 55. Since the other configuration is similar to that of the first embodiment, the same components are designated by the same reference numerals and their description will not be repeated.

In switching device 5, a predetermined item is selected by rotating wheel 6 about rotary shaft 55 as shown by arrow 60 with a finger or the like, and switches 58 and 59 can be turned on/off by sliding wheel 6 along rotary shaft 55 as shown by arrows 61.

Figure 15:
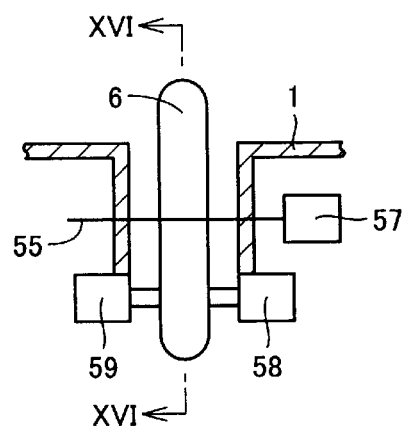
FIG. 15 is a first front view for explaining the operation of the switching device illustrated in FIG. 14 in the third embodiment.
Figure 16:
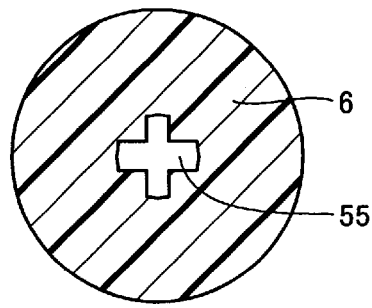
FIG. 16 is a cross section taken along line XVI—XVI of FIG. 15 in the third embodiment.

The operation will be described more concretely. First, as shown in FIGS. 15 and 16, in a normal state, wheel 6 is positioned almost in the center between switches 58 and 59 by the pair of resilient members (refer to FIG. 14).

Figure 17:
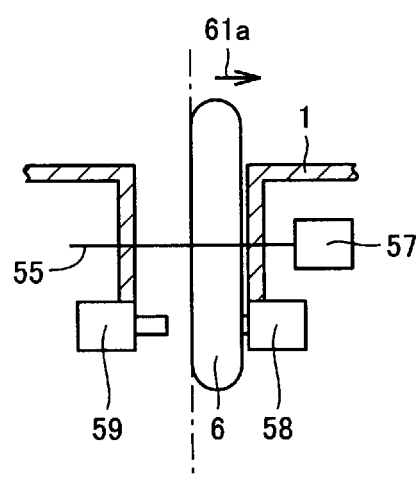
FIG. 17 is a second front view for explaining the operation of the switching device shown in FIG. 14 in the third embodiment.
Figure 18:
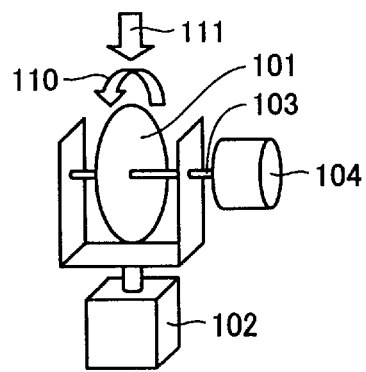
FIG. 18 is a perspective view showing the basic structure of a conventional switching device.

As shown in FIG. 17, by sliding wheel 6 along rotary shaft 55 with a finger or the like in the direction of arrow 61a, the operation of switch 58 is performed. When the finger is away from wheel 6, wheel 6 is returned to the normal position shown in FIG. 15 by the energizing force of resilient members 63. On the other hand, by sliding wheel 6 in the direction opposite to the direction of arrow 61a, the operation of switch 59 is performed.

The portable telephone having such a switching device 5 can also perform an operation similar to that described in the first embodiment. Unlike the conventional switching device, the switch disposed below the wheel is not turned on/off at the time of rotating the wheel. Thus, erroneous operation can be suppressed.

By resilient members 63 having energizing force acting toward wheel 6, the erroneous operation of turning on/off switches 58 and 59 can be prevented from being easily performed.

By the operation of sliding wheel 6 along rotary shaft 55, for example, in the case where the user desires to obtain various information in the Internet connection service, the user can promptly select the menu of desired information to access the information.

In the foregoing embodiments, the cases where the switching device is mounted as that of the portable telephone have been described. Other than such portable telephones, the switching device may be also used for what is called a portable information terminal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A switching device having a wheel rotating about a rotary shaft, comprising:
    a movable mechanism for allowing said wheel to move to one side and the other side approximately along a direction of extension of said rotary shaft; and
    first and second switches disposed on said one side and said other side while sandwiching said wheel, each of which performs a switching operation when being come into contact with said wheel by said movable mechanism.

2. The switching device according to claim 1, wherein said movable mechanism allows said wheel to be tilted about another rotary shaft provided for said wheel.

3. The switching device according to claim 2, wherein said another rotary shaft is disposed in a position passing the center of said wheel, and said first and second switches are disposed while sandwiching said another rotary shaft, on the side opposite to the portion where said wheel is allowed to perform said tilting operation.

4. The switching device according to claim 2, wherein said another rotary shaft is disposed in a position apart from the center of said wheel from the portion where said wheel is allowed to perform said tilting operation, and said first and second switches are disposed between said another rotary shaft and the portion where said wheel is allowed to perform said tilting operation.

5. The switching device according to claim 1, wherein said movable mechanism permits said wheel to slide along said rotary shaft.

6. The switching device according to claim 5, wherein said movable mechanism includes resilient members attached to said one side and said other side of said rotary shaft of said wheel.

7. A portable telephone having a switching device comprising a wheel rotating about a rotary shaft;

a movable mechanism for allowing said wheel to move toward one side and the other side approximately along a direction of extension of said rotary shaft; and first and second switches disposed on said one side and said other side while sandwiching said wheel, which perform a switching operation when being comes into contact with said wheel by said movable mechanism.

* * * * *